United States Patent [19]

Kitago et al.

[11] Patent Number: 4,588,489

[45] Date of Patent: May 13, 1986

[54] METHOD AND APPARATUS FOR MANUFACTURE OF LAMINATE OF FIBROUS SUBSTANCE HAVING ELECTROPHORETIC CHARGE

[75] Inventors: Tohshichi Kitago; Masaharu Fujita; Seishiyo Kumagai, all of Fukushima, Japan

[73] Assignee: Kureha Kagaku Kogyo Kabushiki Kaisha, Tokyo, Japan

[21] Appl. No.: 502,058

[22] Filed: Jun. 7, 1983

[30] Foreign Application Priority Data

Jun. 7, 1982 [JP] Japan ............... 57-96286

[51] Int. Cl.$^4$ ............... C25D 1/18
[52] U.S. Cl. ............... 204/180.9; 204/260; 204/299 EC; 204/301; 99/450.1
[58] Field of Search ............... 204/3, 4, 9, 260, 301, 204/272; D1/3, 181 F, 299 EC; 17/35; 99/450.1, 450.2, 450.6

[56] References Cited

U.S. PATENT DOCUMENTS

| | | | |
|---|---|---|---|
| 644,029 | 2/1900 | Cowper-Coles | 204/9 |
| 1,590,594 | 6/1926 | Taylor | 204/181 F |
| 2,478,322 | 8/1949 | Robinson et al. | 204/181 T |
| 2,613,178 | 10/1952 | Grant | 204/9 |
| 2,865,795 | 12/1958 | Morrison, Jr. | 204/181 F |
| 3,556,969 | 1/1971 | Mizuguchi et al. | 204/181 T |
| 3,616,520 | 11/1971 | Bucalo | 204/9 |
| 3,841,990 | 10/1974 | Sasaki et al. | 204/224 R |
| 3,965,537 | 6/1976 | Ross et al. | 17/42 |
| 3,984,303 | 10/1976 | Peters et al. | 204/260 |
| 4,001,024 | 1/1977 | Dittman et al. | 96/87 R |
| 4,264,422 | 4/1981 | Funabashi et al. | 204/181 F |
| 4,395,320 | 7/1983 | Kasashima et al. | 204/206 |
| 4,455,206 | 6/1984 | Funabashi et al. | 204/181 F |

Primary Examiner—John F. Neibling
Assistant Examiner—Terryence Chapman
Attorney, Agent, or Firm—Sughrue, Mion, Zinn, Macpeak, and Seas

[57] ABSTRACT

A laminate of layers of dissimilar fibrous substances having an electrophoretic charge is produced by the electrodepositing technique in an apparatus comprising an inner electrode disposed horizontally and adapted to accumulate the aforementioned fibrous substances on the surface thereof and a plurality of electrodes of the opposite sign and as many electrodepositing zones for accommodating aqueous suspensions of the aforementioned fibrous substances both disposed horizontally and coaxially in a spaced relationship. The production of the laminate is effected by a method which comprises the steps of feeding at least to adjacent electrodepositing zones the aforementioned aqueous suspensions of fibrous substances causing the fibrous substances to be oriented in different directions at least in the aforementioned adjacent electrodepositing zones, and applying an electric potential between the opposite electrodes thereby allowing the fibrous substances to be accumulated on the surface of the inner electrode.

7 Claims, 4 Drawing Figures

METHOD AND APPARATUS FOR MANUFACTURE OF LAMINATE OF FIBROUS SUBSTANCE HAVING ELECTROPHORETIC CHARGE

FIELD OF THE INVENTION

This invention relates to a method and apparatus for the manufacture of a laminate of a fibrous substance possessing an electrophoretic charge by the electrodeposition of the aforementioned fibrous substance from an aqueous suspension thereof (hereinafter referred to as "electrodepositing liquid").

BACKGROUND OF THE INVENTION

A method is disclosed in Japanese Patent Publication SHO 46(1971)-13636 which produces a shaped article. The method involves placing the electrodepositing liquid in an electrodepositing tank provided with at least one cathode and at least one anode and applying electric potential between the two electrodes mentioned above thereby causing the fibrous substance in the electrodepositing liquid to be accumulated on either of the two electrodes. In this case, the accumulation of the fibrous substance and the consequent formation of the shaped article occur on the surface of the cathode when the pH value of the electrodepositing liquid is adjusted below 6 or on the surface of the anode when the pH value is adjusted above 9.

A known apparatus for the electrodeposition of a fibrous protein has been disclosed which is comprised of an electrodepositing tank, one tubular electrode disposed along the inner wall of the electrodepositing tank, and one other tubular electrode disposed along the inner wall of the first tubular electrode, and serving the purpose of allowing the aforementioned fibrous protein to be deposited in the shape of a tubular layer in a freely extractable manner on the outer periphery of the inner electrode. This apparatus is characterized by providing two stirring devices adapted to rotate in mutually opposed directions, one in the upper region and the other in the lower region respectively of the annular space separating the inner and outer tubular electrodes. This apparatus is described in Japanese Unexamined Utility Model Application SHO 56(1981)-170232.

When a shaped article is obtained from one kind of electrodepositing liquid by the use of one electrodepositing tank as described above, however, the properties of the shaped article produced in a single layer are substantially determined by the properties of the fibrous substance. By using the apparatus described above, there can be obtained an electrodeposited film wherein the fibrous substance is oriented in different directions in the inner surface region and the outer surface region of the film. This film nevertheless is a single-layer product physically. With this apparatus, therefore, it is difficult to give any noticeable alteration to the properties of the single-layer product. When the shaped article is produced in the form of a laminate, this shaped article acquires properties which cannot be expected from a comparable single-layer product. In the case of a sausage casing which is obtained in the form of a laminate by using as fibrous substances two dissimilar electrodepositing liquids, one containing an enzymatically treated fibrous collagen and the other containing an untreated fibrous collagen, for example, when this sausage casing is packed with meat, smoked, and prepared for ready consumption, the presence of the casing arouses absolutely no objectionable sensation to the mouths of those who eat the sausage. This casing cannot be obtained by the conventional method which is directed to the manufacture of a single-layer sausage casing.

As concerns the concept of forming a laminate by partitioning the interior of the electrodepositing tank and feeding two or more dissimilar electrodepositing liquids one each into the separated sections of the tank, an apparatus constructed as illustrated in FIG. 1 and a method for the manufacture of a laminate by the use of this apparatus are disclosed in U.S. patent application Ser. No. 448,569, now abandoned, filed on Dec. 10, 1982 by the present applicants.

In the apparatus illustrated in FIG. 1, reference numeral 1 denotes an electrodepositing tank which is separated with partitions 8, into a plurality of chambers. 2 denotes an inner electrode and 3 an outer electrode. Between the two electrodes, a diaphragm 4 is supported in position by a diaphragm holder 5. An aqueous suspension of a fibrous substance possessing an electrophoretic charge is introduced via feed pipes 9, 9', 9" into an inner electrode chamber 6 defined by the aforementioned diaphragm and an electrode liquid is introduced via a feed pipe 13 into an outer electrode chamber 7. The aforementioned partitions 8 which are spaced by intervals enough to avoid inflicting any injury to the film of fibrous substance formed by electrodeposition between the outer and inner electrodes are attached to the aforementioned diaphragm holder 5. Further, 10, 10' denotes discharge tubes for liquid, 11, 11', and 11" overflow receptacles, and 12, 12' stirring blades which are operated by motors 15, 16.

This apparatus, however, has inevitably entailed the disadvantage that the dissimilar electrodepositing liquids being introduced into the plurality of separated chambers will intermingle with one another at the partitions 8.

SUMMARY OF THE INVENTION

It is an object of this invention to eliminate the disadvantage suffered by the conventional apparatus and provide a method and apparatus for the manufacture of a laminate of dissimilar fibrous substances by the use of an electrodepositing apparatus wherein the electrodepositing zone is separated into a plurality of chambers.

The objects of the invention are accomplished by providing an apparatus for the formation of a laminate of layers of fibrous substances having an electrophoretic charge. The apparatus is comprised of a plurality of electrodepositing tanks which are disposed horizontally and coaxially in a spaced relationship. Each of the tanks are provided with a lid at the end where they are connected to the adjacent tank. The lid is provided with a perforation for permitting passage therethrough of an electrode for accumulating the fibrous substances on the surface thereof. The electrode is located longitudinally in the plurality of electrodepositing tanks. By utilizing the lid of the present invention it is possible to produce a plurality of layers of fibrous substances wherein each of the layers has a different composition or structure. The lid permits the use of different composition or structure. The lid permits the use of different liquids within each of the tanks and prevents intermixing of these liquids during the formation of the fibrous substances within the electrodepositing tanks.

The other objects and characteristic features of the present invention will become apparent to those skilled in the art as the disclosure is made in the following description of a preferred embodiment of the invention, as illustrated in the accompanying sheets of drawings.

DETAILED DESCRIPTION OF THE INVENTION

Figure 1:
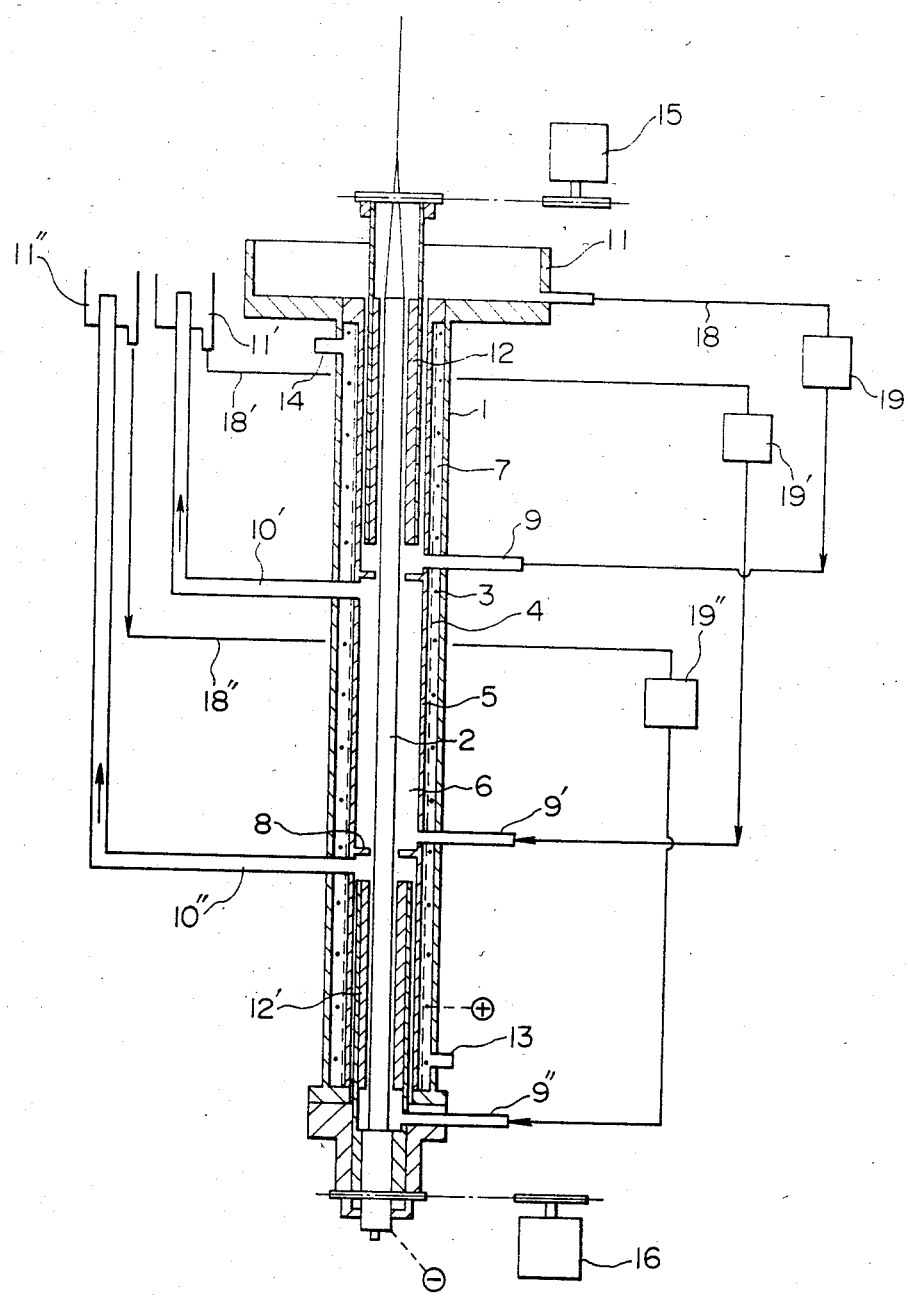
FIG. 1 is a cross section of an electrodepositing apparatus to be used for working the conventional method.
Figure 2:
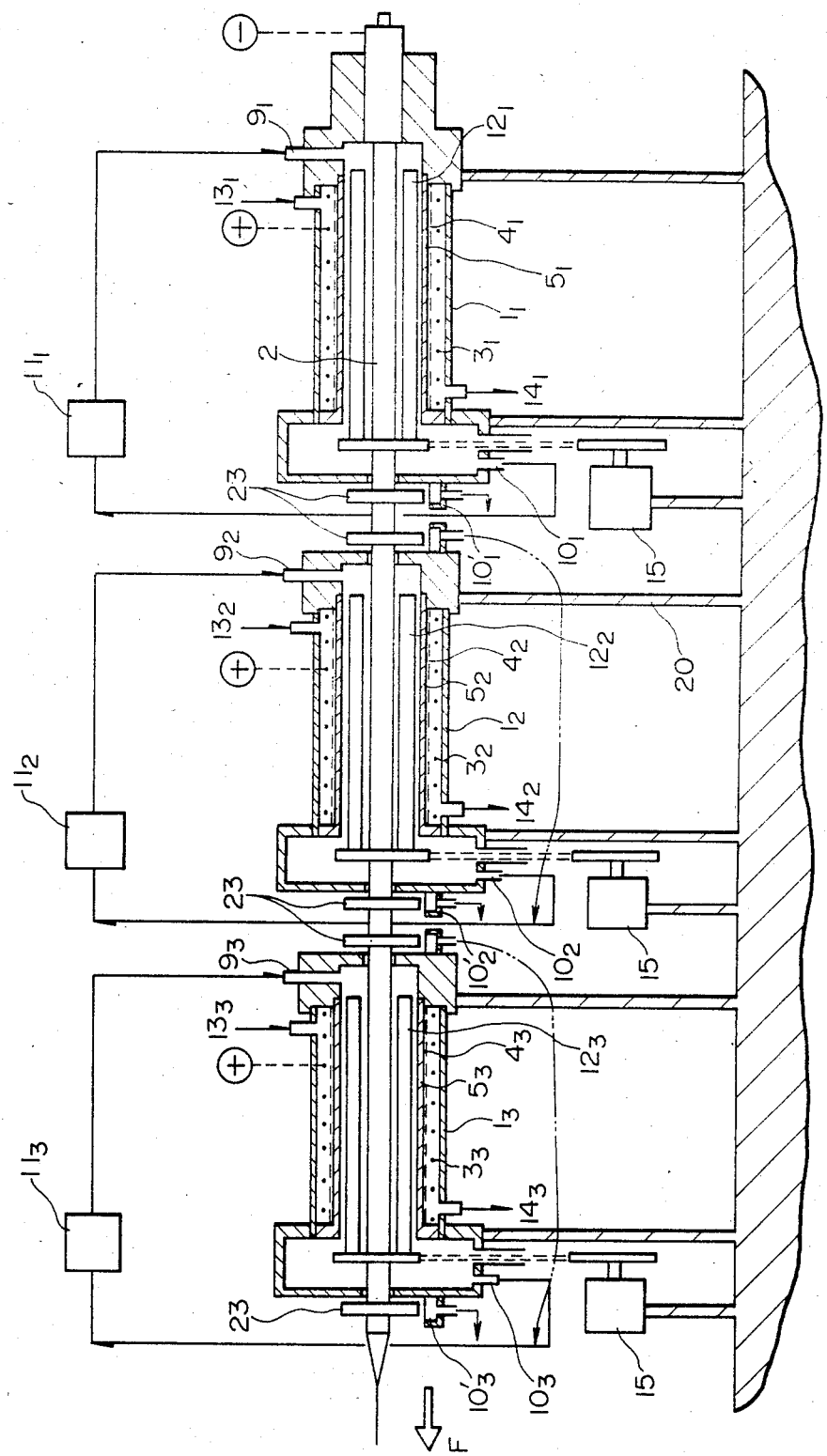
FIG. 2 is a cross section of an electrodepositing apparatus contemplated by the present invention.

The present invention will now be described below with reference to FIG. 2 which represents a cross section of the apparatus of the present invention for the manufacture of a laminate of fibrous substance. In the diagram, $1_1, \ldots 1_n$ denote tubular electrodepositing tanks which are disposed horizontally coaxially as spaced by fixed intervals.

Directly inside the electrodepositing tanks $1_1, \ldots 1_n$ there are disposed outer electrodes $3_1, \ldots 3_n$ (which may be anodes or cathodes). Inside the outer electrodes, there are disposed diaphragms $4_1, \ldots 4_n$ which are supported by diaphragm holders $5_1, \ldots 5_n$ coaxially with the outer electrodes. The electrodepositing tanks $1_1, \ldots 1_n$ may be provided in the interior thereof with stirring blades $12_1, \ldots 12_n$. The stirring blades are driven by a motor 15 through the medium of a belt, for example. The electrodepositing tanks are further provided near one end thereof with electrodepositing liquid feed pipes $9_1, \ldots 9_n$ and electrode liquid feed pipes $13_1, \ldots 13_n$ and near the other end thereof with electrodepositing liquid discharge pipes $10_1, \ldots 10_n$ and electrode liquid discharge pipes $14_1, \ldots 14_n$.

The electrodepositing liquid is passed through the diaphragms $4_1, \ldots 4_n$ and also fed into the zone inside these diaphragms.

An inner electrode 2 (which may be a cathode or an anode) on the surface of which the fibrous substance is to be accumulated is pierced through the plurality of electrodepositing tanks 1 disposed horizontally and coaxially and is secured in position by being fastened at one end thereof.

The inner electrode 2 pierces the end of the first electrodepositing tank opposite the fastened end thereof and both ends of each of the second and subsequent electrodepositing tanks. It is further provided with lid means 23 (whose positions are schematically shown in FIG. 2) covering holes spaced by intervals enough to avoid inflicting any injury to the product formed and allowed to move near the surface of the inner electrode 2. The electrodepositing liquid is retained inside the electrodepositing tanks $1_1, \ldots 1_n$.

Figure 3:
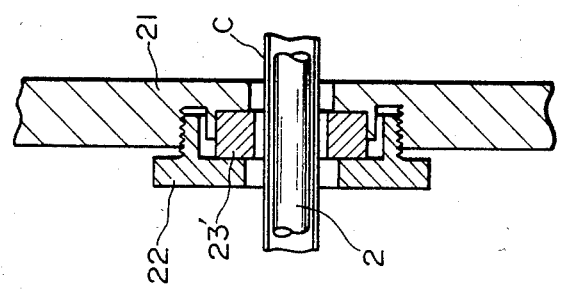
FIG. 3 is a cross section of an end portion of the electrodepositing apparatus for the method of this invention.

One example of the lid 23 is illustrated in a cross section in FIG. 3, in which 21 denotes part of the vertical wall of the electrodepositing tank 1, reference numeral 22 a retainer lid, and 23' an annular lid. The retainer 22 is threadedly engaged with the vertical wall 21 to retain therein the lid 23'. In FIG. 3, reference character C denotes the casing being produced. The electrodepositing liquid which has leaked through the lid portion is received in the receptacles $10_1', \ldots 10_n'$ disposed thereunder, combined with the liquid brought in from the discharge pipes $10_1, \ldots 10_n$, and returned to the receptacles $11_1, \ldots 11_n$.

When the electrodepositing liquids fed to the adjacent electrodepositing tanks are dissimilar to each other, these electrodepositing tanks must be separated by distances large enough to prevent the dissimilar electrodepositing liquids from being mixed with each other. Optionally, the electrodepositing tanks $1_1, \ldots 1_n$ may be provided in the interiors thereof with stirring blades $12_1, \ldots 12_n$. These stirring blades may be provided so that the plurality of electrodepositing tanks will each contain one or more stirring blades. Otherwise, they may be so provided that only part of the electrodepositing tanks will each contain one or more stirring blades. When stirring blades are provided in adjacent electrodepositing tanks, they are desired to be operated in mutually opposite directions and/or at different rates of speed. In FIG. 2, reference numeral 20 denotes a support leg for the apparatus of the present invention.

The method of this invention for the manufacture of the laminate of a fibrous substance will now be described below with reference to FIG. 2. The electrode liquid is poured into the tubular electrodepositing tank $1_1$ via the electrode liquid feed pipe $13_1$. In the present embodiment, the electrode liquid is a hydrochloric acid solution having a pH value of 3 to 4. The electrode liquid flows between the diaphragm $4_1$ and the outer tube of the electrodepositing tank $1_1$ and is discharged via the electrode liquid discharge pipe $14_1$. The same flow of the electrode liquid takes place between the electrode liquid feed pipes $13_2, \ldots 13_n$ and the electrode liquid discharge pipes $14_2, \ldots 14_n$. The electrodepositing liquid is poured through the electrodepositing liquid feed pipe $9_1$. It is an aqueous suspension of a fibrous substance. In the present embodiment, this is a hydrochloric acid solution having the fibrous substance suspended therein and having a pH value of 3 to 4. The electrodepositing liquid flows between the diaphragm $4_1$ and the inner electrode 2. By applying positive electric potential to the outer electrode $3_1$ and negative electric potential to the inner electrode 2 (such that the potential difference amounts to 700 V in the present embodiment ), the fibrous substance is accumulated on the inner electrode 2. Thus, inside the electrodepositing tank $1_1$, the fibrous substance is accumulated on the inner electrode. When the aggregate of the fibrous substance is drawn out in the axial direction of the inner electrode (as shown by the arrow F), there is obtained a tubular aggregate of fibrous substance.

Another type of electrodepositing liquid different from the electrodepositing liquid used in the first electrodepositing tank is used in the second electrodepositing tank $1_2$ (without changing the electrode liquid). Accordingly, a different type of fibrous substance is naturally accumulated in the electrodepositing tank $1_2$ on the tube of fibrous substance already formed in the first electrodepositing tank $1_1$. By the same token, in the third electrodepositing tank $1_3$, yet another type of fibrous substance could be superposed as a third layer.

Inside the electrodepositing tanks, stirring blades may be provided between the diaphragms and the electrodes on the surface of which the fibrous substances are to be accumulated, so that they will be operated to effect desired orientation of fibrous collagen being deposited, for example.

EXAMPLE

Figure 4:
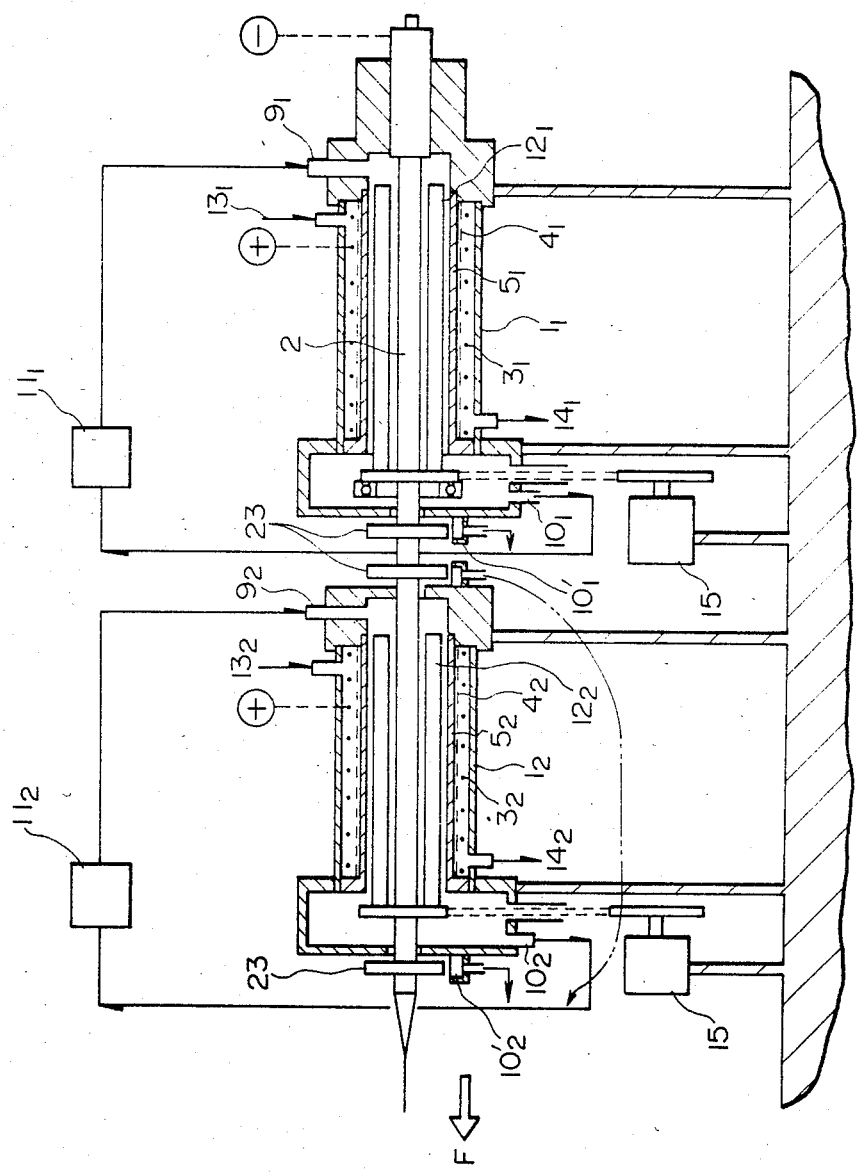
FIG. 4 is a cross section of one preferred embodiment of this invention which possesses two electrodepositing tanks.

FIG. 4 illustrates a working example of this invention incorporating two electrodepositing tanks. Into the electrodepositing tank $1_1$, the electrodepositing liquid containing an enzymatically treated fibrous collagen is introduced via the electrodepositing liquid feed pipe $9_1$. The electrode liquid is introduced therein via the electrode liquid feed pipe $13_1$. An excess of the electrodepositing liquid containing the enzymatically treated fibrous collagen is discharged via the electrodepositing liquid discharge pipe $10_1$ and returned to the overflow receptacle 11. The electrode liquid is discharged via the electrode liquid discharge pipe $14_1$. These two liquids have their pH values controlled in the range of 3 to 4. A DC electric potential of 700 V is applied between the two electrodes. The aggregate of the fibrous substance accumulated on the surface of the electrode 2 on the surface of which the fibrous substance is to be accumulated is drawn in the direction of the arrow F. The aggregate in the shape of a tube is consequently drawn into the electrodepositing tank $1_1$ and out of the lefthand end of the electrode $1_2$.

Into the electrodepositing tank $1_2$, the electrodepositing liquid containing a neat fibrous collagen is introduced via the electrodepositing liquid feed pipe $9_2$. The electrode liquid is introduced therein via the electrode liquid feed pipe $14_2$. An excess of the electrodepositing liquid of the neat fibrous collagen is discharged via the electrodepositing liquid discharge pipe $10_2$. These two liquids have their pH values adjusted in the range of 3 to 4. A DC electric potential of 700 V is applied between the two electrodes.

The aggregate of the fibrous substance accumulated in the shape of a tube on the surface of the electrode 2 within the electrodepositing tank $1_1$ is drawn leftward past the electrode 2 within the electrodepositing tank $1_2$. Consequently, an electrodeposited layer of the neat fibrous collagen is formed as superposed on the tube of the enzymatically treated fibrous collagen previously formed inside the electrodepositing tank $1_1$. The two-layer tube of fibrous collagen thus drawn out of the apparatus possesses a composite texture, i.e. it has the fibrous collagen in a form impregnated with an enzyme in the inner layer and in a neat form in the outer layer.

Since the present invention is constructed as described above and liberated from the disadvantage of entailing otherwise inevitable admixture of electrodepositing liquids of dissimilar properties from different electrodepositing tanks, it enables a desired laminate to be produced in consistent quality at all times. This invention has another advantage that the apparatus can be constructed in a height of about 1.5 m, a size quite convenient for the work to be performed by the operator.

What is claimed is:

1. A method for the manufacture of a laminate of layers of fibrous substances having an electrophoretic charge by an electrodepositing technique using an electrodepositing apparatus comprising an inner electrode adapted to accumulate said fibrous substances on the surface thereof and a plurality of outer electrodes of the opposite pole and a number of electrodepositing zones corresponding to the number of said plurality of outer electrodes for accommodating aqueous suspensions of said fibrous substances, said electrodepositing zones being spaced suitably along said inner electrode, said method comprising the steps of: feeding at least to adjacent electrodepositing zones said aqueous suspensions of fibrous substances having dissimilar properties or causing said fibrous substances to be oriented in different directions at least in said adjacent electrodepositing zones and applying an electric potential between said inner electrode and each of said plurality of outer electrodes thereby allowing said fibrous substances to be accumulated on the surface of said inner electrode, said inner electrode being disposed horizontally.

2. An apparatus for the formation of a laminate of layers of fibrous substances having an electrophoretic charge, characterized by having a plurality of electrodepositing tanks disposed horizontally and coaxially in a space relationship, said electrodepositing tanks each comprising a tubular wall, an outer electrode disposed coaxially along an inner wall of said tubular wall, a diaphragm disposed coaxially along an inner wall of said outer electrode, an electrodepositing liquid feed means and an electrode liquid feed pipe provided near one end of said tubular wall, an electrodepositing liquid discharge means and an electrode liquid discharge means provided near the other end of said tubular wall, and lid means attached to opposite axial ends of said tubular wall and provided therein with a perforation for permitting passage therethrough of one inner electrode for accumulation of said fibrous substances on the surface thereof and further having said one inner electrode pierced through said plurality of electrodepositing tanks for enabling said fibrous substances to be accumulated on the surface of said one electrode inside the plurality of elctrodepositing tanks.

3. The apparatus according to claim 2, further including a stirring blade provided in each zone between said diaphragm and said one electrode in that zone, on the surface of which said fibrous substances are to be accumulated.

4. The apparatus according to claim 2, said lid means including an annular disc, a vertical wall of said electrodepositing tank and a lid retainer.

5. The apparatus according to claim 4, said lid means further including screw means provided between said vertical wall and said lid retainer.

6. A method for the manufacture of a laminate of dissimilar layers of fibrous substances having an electrophoretic charge by an electrodepositing technique using an electrodepositing apparatus comprising an inner electrode adapted to accumulate said fibrous substances on the surface thereof and a plurality of outer electrodes of the opposite pole and a number of electrodepositing zones corresponding to the number of said plurality of outer electrodes for accommodating aqueous suspensions of said fibrous substances, said electrodepositing zones spaced suitably along said inner electrode, said method comprising the steps of: feeding at least to first and second adjacent electrodepositing zones said aqueous suspensions of fibrous substances having dissimilar properties or causing said fibrous substances to be oriented in different directions at least in said adjacent electrodepositing zones and applying an electric potential between said inner electrode and each of said plurality of outer electrodes thereby allowing said fibrous substances to be accumulated on the surface of said inner electrode, said inner electrode being disposed horizontally, and carrying out said process in a manner whereby a first fibrous substance in the form of a deposited layer is drawn from said first adjacent electrodepositing zone into at least said second adjacent electrodepositing zone wherein a second fibrous substance is deposited on said first fibrous substance to form a laminate of dissimilar layers.

7. An apparatus for the formation of a laminate of layers of fibrous substances having an electrophoretic charge, said apparatus comprising:

a first electrodepositing tank having a tubular outer wall, an outer electrode along a radially inner surface of said tubular wall and coaxial therewith, a diaphragm disposed coaxially along a radially inner surface of said outer electrode, electrodepositing liquid feed means and an electrode liquid feed pipe at a first axial end of said tubular outer wall, electrodepositing liquid discharge means and an electrode liquid discharge means at a second opposite end of said tubular outer wall, at least one end of said first tank being provided with an aperture therein;

a second electrodepositing tank having a tubular outer wall, an outer electrode along a radially inner surface of said tubular outer wall and coaxial therewith, a diaphragm disposed coaxially along a radially inner surface of said outer electrode, electrodepositing liquid feed means and an electrode liquid feed pipe at a first axial end of said tubular outer wall, electrodepositing liquid discharge means and an electrode liquid discharge means at a second opposite end of said tubular outer wall, both ends of said second tank being provided with apertures therein;

an inner electrode for accumulating fibrous substances on the surface thereof, said inner electrode extending through all of said apertures, whereby said inner electrode is shared in common by each of said first and second electrodepositing tanks;

liquid collection means disposed beneath said aperture in said first electrodepositing tank for collecting electrodepositing liquid escaping said first electrodepositing tank through said aperture and for returning the collected liquid to said first electrodepositing tank; and further liquid collection means disposed beneath said apertures in said second electrodepositing tank for collecting electrodepositing liquid escaping said second electrodepositing tank through said apertures in said second electrodepositing tank and for returning the second electrodepositing liquid to said second electrodepositing tank.

* * * * *